May 28, 1935.  J. J. McLAUGHLIN  2,002,671
SCREW AND TRUNNION NUT DEVICE AND METHOD OF MAKING IT
Filed Feb. 21, 1935
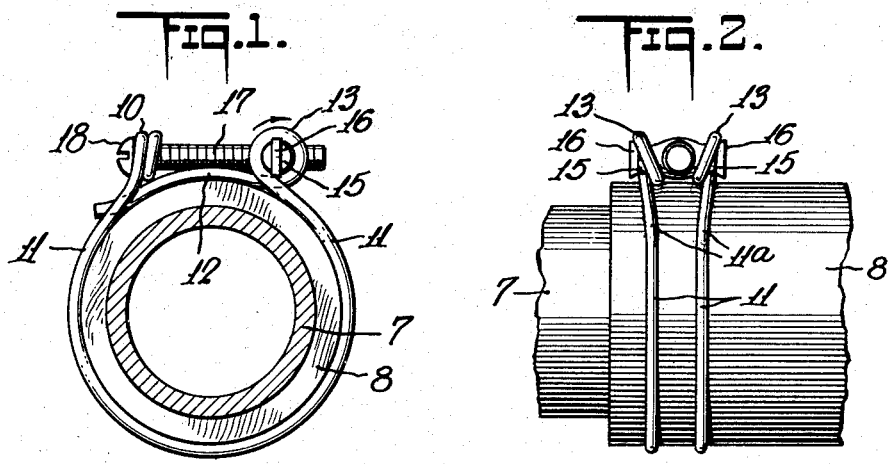
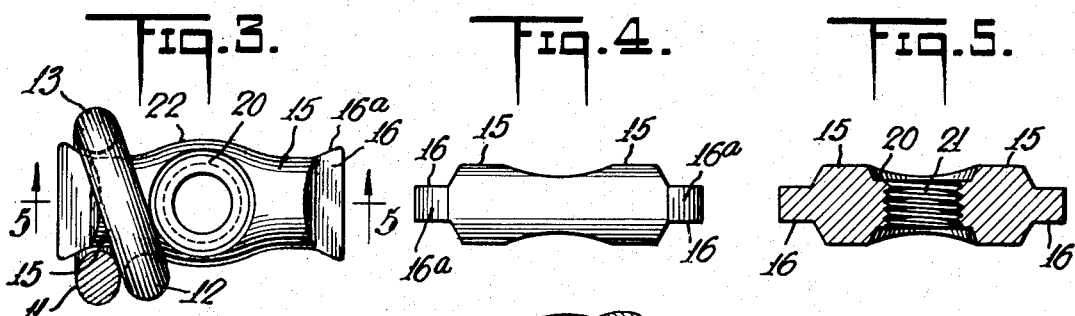
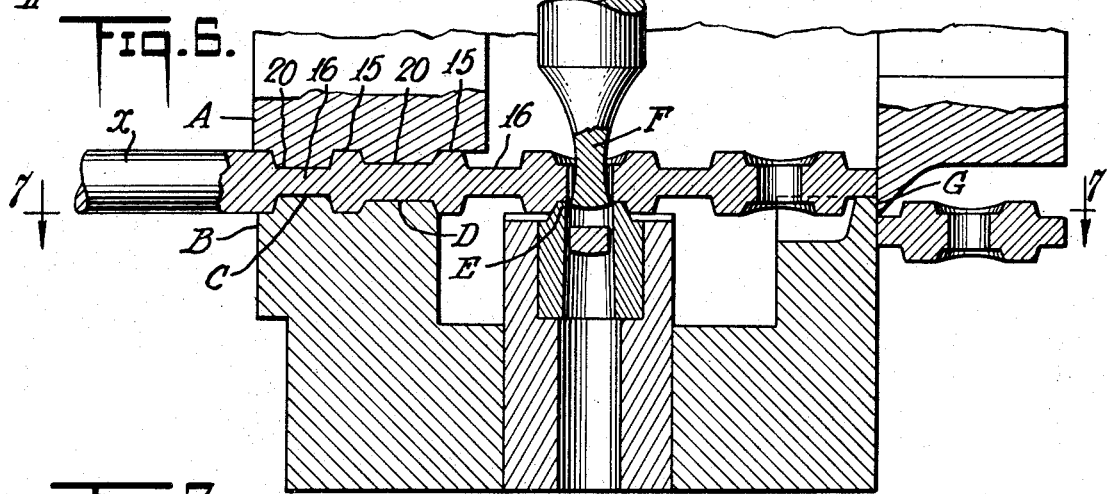
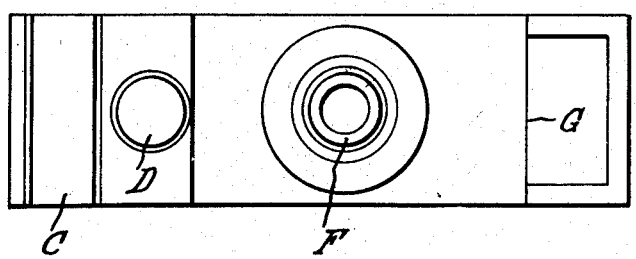
INVENTOR
John J. McLaughlin
BY
George C. Dean
ATTORNEY Patented May 28, 1935

2,002,671

UNITED STATES PATENT OFFICE 2,002,671

SCREW AND TRUNNION NUT DEVICE AND METHOD OF MAKING IT

John J. McLaughlin, North Tonawanda, N. Y., assignor to Buffalo Bolt Company, North Tonawanda, N. Y., a corporation of New York Application February 21, 1935, Serial No. 7,509

14 Claims. (Cl. 10—86)

My present invention results from my practical experience with hose clamps of the type shown in Patent 1,815,145, granted July 21, 1931, and particularly from my experience in connection with large quantity production of trunnioned nuts therefor. As shown in the patent, the clamp is of a type having an upstanding bearing in which the head of the clamping screw is swivelled, and in which the hose engaging body of the clamp consists of more or less parallel wires which are bent circularly to fit the hose, and at a point adjacent the nut end of the clamping screw, are provided with means for engaging opposite aligned projections on a clamping nut threaded on the clamping screw.

While my invention centers on a nut having opposite aligned projections for applying tension or thrust of a screw, its novel features have special significance in connection with projection-engaging wire loops that resemble those shown in said patent. In said patent the wires are similarly and symmetrically bent helically outward and toward one another to form a pair of single-turn loop bearings for the nut projections, and the projections are trunnions, the ends of which have annular flanges intended to hold the loops from slipping off.

These flanges are unsatisfactory for that purpose, and also as concerns cheap quantity production, becaue it has been found impractical to merely upset the ends of the trunnions to form flanges of the desired depth, or to form them by turning the trunnions in a lathe. So in practice, they were made by stamping cylindrical stock to flatten the central thread portion, and to stamp circular portions for the upper and lower halves of the flanged trunnions. The latter operation presses out flashes along the trunnions; and the practice was to drill and tap the central portion and finally remove the flashes in a trimming press.

As contrasted with this, my invention contemplates taking cylindrical stock of approximately the diameter desired for the trunnions and run it through a reciprocating press machine wherein a single pair of dies depress and thereby expand the central nut portion between the trunnions, and also flatten the ends beyond the trunnions so that the edges diverge outwardly from the trunnions toward the ends, as widely as may be desired for securely holding the loops of the wire from slipping off the ends of the trunnions. The intermittently moving blank then passes under a punch which punches the central hole for the screw thread, and then under a knife which severs the blanks which are then completed by tapping threads in the preformed hole therefor.

Thus all the stock is used except the slug punched from the center, and the automatic flattening punch and cut-off completes the nut ready for screw tapping. The resulting nut has special novelty and advantages where it is used as a trunnion nut in combination with the wire loop bearings shown in said patent.

The above and other features of my invention may be more fully understood from the following description in connection with the accompanying drawing, in which Fig. 1 is a view, transversely of the hose pipe, showing a hose clamp in side elevation;

Fig. 2 is a side elevation of the hose, affording a view of the clamp viewed from the nut end of the clamping screw;

Figs. 3, 4 and 5 are respectively face edge and longitudinal sectional views of my improved nut clamp, on a much larger scale than that of Fig. 2, the section shown in Fig. 5 being on the line 5—5, Fig. 3;

Fig. 6 is a vertical section through the operating parts of the die punch and cut-off, with the stock in place therein;

Fig. 7 is a face view of the lower stationary member of the press.

In the illustrative form shown in Figs. 1 and 2, the body of the clamp is somewhat like that shown in said patent. It is preferably formed from a single length of stout and stiff wire of considerably resiliency. This wire is doubled and bent to form a short helix 10 preferably having one and one-half convolutions. The wire ends extend from this helix in generally parallel relation and are curved in a direction at right angles to the helix to form spaced rings 11 the ends 12 of which lie between the bodies of the rings adjacent the helix 10. Adjacent the ends the wires are each bent in a single convolution to form a pair of axially aligned bearings 13.

A nut is provided between the bearings 13, and it has oppositely extending projections carried in said bearings, each projection including a rounded, trunnion-like portion 15, 16, formed so as to secure the projections in the bearings and also to prevent the bearings from springing apart. Through the helix 10 extends a screw 17 which is threaded into the nut and has its head 18 bearing against the outer end of the helix.

The clamp is used in the manner common to such articles, being placed on the hose 8 with the screw at least partly unscrewed. After the clamp is adjusted to proper position the screw is screwed up, thereby contracting the annular clamp body. As the diameter of the clamp contracts, the wire bearing loops rotate slightly with respect to the trunnions, in a direction tending to wind up the bearing loops clockwise on the trunnions, as indicated by the arrow on Fig. 1, and the purpose in view is to permit free slip and so minimize such wind-up tendency.

As shown in Fig. 2, the wires 11ᵃ diverge outward to the trunnions so that they approach and engage the trunnions inside of the end flanges, and this divergence continues through the first half circle around the trunnions where all of the clamping stress is applied. Consequently, stress applied by the trunnions tends to draw loop bearings 13 away from the ends of the trunnions.

A preferred form of the trunnioned nut is clearly shown in Figs. 3, 4 and 5, and the method of making it is shown in Figs. 6 and 7. The cylindrical rod or wire $x$ may be of diameter equal to the minimum diameter desired for the trunnions 15. The first pair of dies A, B, have similar equal projections C, which, as will be evident from Fig. 7, vertically flatten and laterally expand the rod, thus providing a flat with a bulging edge suitably shaped so that when severed at the center they form the wedge-shaped, loop-retaining projections 16, for the ends of adjacent trunnions of two blanks. The same pair of dies also carry opposite similar circular projections D spaced apart from B a sufficient distance to leave an intervening cylindrical portion of the stock, suitable for the trunnions. These cylindrical projections D, D, punch-flatten the rod to form opposite cylindrical depressions 20 and also to bulge the metal laterally as at 22 to form a substantial strengthening annulus, outside of said depressions.

Upon withdrawal of the dies, the thus formed unsevered blanks are fed forward to a piercing die E and punch F, whereby the hole for screw-thread 21 is punched out, and on the next feed the blank is projected a proper distance beyond the shear G which severs the blank as indicated at the right in Fig. 6. The hole is then threaded as at 21, thereby completing the nut, which may then be galvanized, or used without galvanizing.

The above feature of making the retaining member a wedge instead of an annular flange has several advantages. As it can engage with the wire of loop 13 only at diametrically opposite points, it is easy to flatten the stock down to whatever thinness is necessary to spread the metal laterally and make the wedges 16a project radially to whatever extent may be considered necessary or desirable for safely holding the loops 13 from slipping off the ends of the trunnion 15.

While the wedge flattening at 16 might be in the plane of the axis of the nut and screw, and while a nut so made would be useful, it would require a die operating at a right angle to the direction of the nut forming die C. Moreover, it is desirable to have the over-all length of the circular part of the trunnion 15 plus length of the wedge-flattened part 16, as short as practicable in order not to have the wedge corners project too far beyond the protection of wire loop bearings 13. Consequently, under the rough and ready conditions of actual practice, the first half turn of the wire loops 13 may not always bear squarely on the cylindrical part 15; and in such case the wedge flattened part 16 will apply part or all of the tension stress to the first half turn of loop 13.

From the above, it will be evident that while the cylindrical part 15 may be made long enough and the wedge-edge 16 steep enough so that in practice the part 15 always has all the trunnion function and the wedge part 16 no trunnion function, I prefer the more practical proportions indicated in Fig. 3. With the trunnion and wedge proportions shown in this Fig. 3, it is evident that even with a tight fit for the loop 13 on the trunion 15, the wedge edge 16a has some trunnion function; and if there is any looseness of fit of the loop on the trunnion, such as frequently occurs in practice and as clearly shown in Fig. 1, substantially all of the trunnion function may be shifted to the wedge 16. When this occurs, it is obvious that if the wedge flattening is parallel with the axis of the tensioning screw, all of the stress would be applied on only one wedge edge 16a and this edge will have practically single-point bearing on the loop and said bearing will be on a part of the loop where it will have maximum distorting effect. Moreover, the thin wedge edge will tend to bite into the metal of the loop, and wind-up effect will be a maximum and will be in a direction to draw the bottom of the loop outward away from the hose. As contrasted with this, having the wedge flattened portion in a plane at right angles to the axis of the screw gives two opposite bearing points on each loop for the wedge edges 16a of each projection; and the wind-up effect indicated by the arrow on Fig. 1 is exerted mainly by the lower wedge edge 16a and so is exerted parallel with the surface of the hose instead of away from it.

As a concrete illustration of my invention, it may be noted that a two-inch hose clamp may be bent up from stiff resilient wire about $\tfrac{1}{16}$ inch in diameter, in which case the over-all length of my trunnion nut and its retaining wedges may be ¾ of an inch or less, the diameters, lengths and shapes of nut portions 20, 22, cylindrical portions, 15, and wedge-flattened portions 16 being preferably those indicated in the drawing.

Of course all parts of the clamp may be made on much smaller or larger scale; and their proportions may be varied and the trunnion nut may be used for purposes other than tensioning hose clamps.

While I have described my trunnioned "nut" as screw-threaded, it will be obvious that most of my novel features of construction, functioning and method of making, will remain substantially the same, when screw 17 is is swivelled in the hole through the nut, and its thread engages a suitable thread in the other end of the clamp. Therefore, while "nut" as used in the appended claims may be ordinarily understood to imply a screw-threaded nut, it may also be construed to include a swivel nut, wherever necessary for equitable protection of novel features in claims that are patentable independently of whether the nut has swivel or thread engagement with the screw.

I claim:

1. A method of making screw-threaded nuts having integral oppositely extending trunnions including a substantially circular portion adjacent the nut and an end portion flattened and expanded to retain bearings from slipping off the end thereof, which method includes flattening approximately cylindrical stock having approximately the diameter of said rounded portions of the trunnion, said flattening being at intervals corresponding to the over-all length of the trunnioned nut, the flattening including punch-flattening an area between the trunnions to expand the metal to the diameter desired for the body of the nut to form a depression through the bottom of which a screw hole may be formed; and on either side of said nut at intervals approximately equalling the desired length of the circular portion of the trunnion, flattening the stock across the width thereof for a length equal to that of two end portions of two adjacent blanks and to a depth necessary to spread the metal laterally to a diameter substantially greater than that of said circular portion of the adjacent trunnions; and while punching flattening the screw depression for one nut and a flat for the ends of two adjacent trunnions, punching a hole for a screw-thread through the punch-flattened nut portion of a previously shaped blank, and finally severing the blanks by sucessive cuts approximately midway of said laterally-spread end portions.

2. A method of making screw-threaded nuts having integral oppositely extending trunnions including a substantially circular portion adjacent the nut and an end portion flattened and expanded to retain bearings from slipping off the end thereof, which method includes applying pressure in a single direction to flatten approximately cylindrical stock having approximately the diameter of said rounded portions of the trunnion, said flattening being at intervals corresponding to the over-all length of the trunnioned nut, the flattening including punch-flattening an area between the trunnions to expand the metal to the diameter desired for the body of the nut to form a depression through the bottom of which a screw hole may be formed; and on either side of said nut at intervals approximately equalling the desired length of the circular portion of the trunnion, flattening the stock across the width thereof for a length equal to that of two end portions of two adjacent blanks and to a depth necessary to spread the metal laterally to a diameter substantially greater than that of said circular portion of the adjacent trunnions; and severing the blanks by successive cuts approximately midway of said laterally-spread end portions.

3. A method of making nut blanks having integral, oppositely extending projections each including a rounded portion of less diameter than the nut and a portion that is thinner than the rounded portion and has edges diverging toward the end of the projection; which method includes feeding round stock having a diameter approximating that of said rounded portion, by feeding the stock, step-by-step, through distances corresponding to the over-all length of the blanks; and, between steps, at intervals equal to the length of one blank, punch-flattening the stock to expand the metal to the desired diameter of the body of the nut and to form depressed portions through the bottom of which the screw-thread may be formed; flattening the stock to thin it and laterally bulge it over a length and to a depth required for diverging end portions of two adjacent blanks; and severing the blanks by successive cuts approximately midway of said laterally-bulged end portions.

4. A method of making nut blanks having integral, oppositely extending projections each including a rounded portion of less diameter than the nut; which method includes shaping cylindrical stock having a diameter approximating that of said rounded portion, by feeding the stock step-by-step, through distances corresponding to the over-all length of the blanks; and, between steps, at intervals equal to the length of one blank, punch-flattening the stock to expand the metal to the desired diameter of the body of the nut and to form depressed portions through the bottom of which the screw-thread may be formed; and severing the blanks by successive cuts midway between the punch-flattened depressions.

5. A method of making nut blanks having integral, oppositely extending projections each including a rounded portion of less diameter than the nut; which method includes shaping cylindrical stock having a diameter approximating that of said rounded portion, by feeding the stock step-by-step, through distances corresponding to the over-all length of the blanks; and, between steps, at intervals equal to the length of one blank, punch-flattening the stock to expand the metal to the desired diameter of the body of the nut and to form depressed portions through the bottom of which the screw-thread may be formed; and, while thus punch-flattening the screw depression for the nut of one blank, punching a hole for a screw-thread through the punch-flattened nut portion of a previously shaped blank; and severing the blanks by successive cuts midway between the punch flattened depressions.

6. A method of making nut blanks having integral, oppositely extending projections each including a rounded portion of less diameter than the nut and an end portion that is thinner and wider than the rounded portion; which method includes shaping round stock having a cross sectional area approximating the cross-section of the rounded portions of the projections, by feeding the stock step-by-step, through distances corresponding to the over-all lengths of the blank; and, between steps, applying single direction pressure to the stock to simultaneously flatten properly spaced portions thereof and shape the nuts and projections of a succession of integrally connected blanks; said flattening including punch-flattening the stock to expand the metal to the desired diameter of the body of the nut and to form depressed portions through the bottom of which the screw-thread may be formed; and simultaneously, at a suitable distance from the nut screw depression, flattening the stock to thin it and laterally bulge it over a length and to a depth required for the wider end portion of two adjacent blanks; and severing the blanks by successive cuts approximately midway of said laterally-bulged end portions.

7. A method of making nut blanks having integral, oppositely extending projections each including a rounded portion of less diameter than the nut and an end portion that is thinner and wider than the rounded portion; which method includes shaping round stock having a cross-sectional area approximating the cross-section of the rounded portions of the projections, by feeding the stock step-by-step, through distances corresponding to the over-all lengths of the blank; and, between steps, applying single direction pressure to the stock to simultaneously flatten properly spaced portions thereof and shape the nuts and projections of a succession of integrally connected blanks; said flattening including punch-flattening the stock to expand the metal to the desired diameter of the body of the nut and to form depressed portions through the bottom of which the screw-thread may be formed; and simultaneously, at a suitable distance from the nut screw depression, flattening the stock to thin it and laterally bulge it over a length and to a depth required for the wider end portion of two adjacent blanks; and, while thus punch-flattening the screw depression for the nut of one blank and widening the stock to form adjacent ends for two blanks, punching a hole for a screw-thread through the punch flattened nut portion of a previously shaped blank; and severing the blanks by successive cuts approximately midway of said laterally-bulged end portions.

8. A trunnioned nut comprising metal stamped from substantially cyclindrical stock having approximately the diameter of the trunnions, having the center punch-flattened to expand the metal to desired diameter of the body of the nut and to form a depression through the bottom of which a screw-thread is formed, and also flattened at the ends beyond said cylindrical portion to spread the metal laterally, to a diameter substantially greater than that of said cylindrical portion.

9. As an article of manufacture, a nut having integral oppositely extending projections; the nut portion having exteriorly rounded portions and a thinner depressed central portion through which the thread is tapped; said rounded exterior portions curving longitudinally into substantially circular portions adjacent the nut depression and the ends beyond said circular portions being flattened in a plane at right angles to the axis of the screw-thread and having laterally diverging edges of greater diameter than said circular portion.

10. A trunnioned nut the body of which is in planes transverse to the axis of the trunnions rounded and which merges longitudinally by smooth curves into trunnion portions of circular cross section, whereby adjacent portions of the nut body may be utilized for trunnion purposes.

11. A nut formed with oppositely extending projections the end portions of which are laterally flattened to present edges diverging outwardly towards the end of each of the projections.

12. A nut formed with oppositely extending projections the end portions of which are laterally flattened and laterally widened in planes at right angles to the nut axis, to present edges diverging outwardly towards the end of each of the projections.

13. In a hose clamp of a type in which the body portion includes two more or less parallel lengths of wire adapted to encircle the hose and a tensioning screw having conventional tangential relation to adjacent ends of said body portion and adapted to apply tension to the free ends of said wires through adjacent portions of said wires which are bent outwardly and helically inward to form a pair of opposite upstanding single-turn bearing loops; a trunnioned nut in which said screw is rotatable, the trunnions of the nut each including a portion of circular cross-section adjacent the nut portion and an end portion which is flattened to spread the metal laterally so as to present wedge edges of greater radius than the circular portion, for holding the loops against slipping off the end of the trunnion.

14. In a hose clamp of a type in which the body portions includes two more or less parallel lengths of wire adapted to encircle the hose and a tensioning screw having conventional tangential relation to adjacent ends of said body portion and adapted to apply tension to the free ends of said wires through adjacent portions of said wires which are bent outwardly and helically inward to form a pair of opposite upstanding single-turn bearing loops; a trunnioned nut in which said screw is rotatable, the trunnions of the nut each including a portion of circular cross-section adjacent the nut portion and an end portion which is flattened to spread the metal laterally so as to present wedge edges of greater radius than the circular portion, for holding the loops against slipping off the end of the trunnion, the flattening and lateral spread of said end portions being in a plane approximately perpendicular to the axis of the screw.

JOHN J. McLAUGHLIN.